(12) United States Patent
Nam (10) Patent No.: US 12,103,493 B2
(45) Date of Patent: Oct. 1, 2024

(54) VEHICLE CONTROL SYSTEM AND METHOD OF CONTROLLING VEHICLE

(71) Applicants: HYUNDAI MOTOR COMPANY, Seoul (KR); KIA CORPORATION, Seoul (KR)

(72) Inventor: Minhwan Nam, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 70 days.

(21) Appl. No.: 17/983,722

(22) Filed: Nov. 9, 2022

(65) Prior Publication Data
US 2023/0174016 A1 Jun. 8, 2023

(30) Foreign Application Priority Data
Dec. 6, 2021 (KR) .......... 10-2021-0172875

(51) Int. Cl.
*B60R 25/24* (2013.01)
*G07C 9/00* (2020.01)

(52) U.S. Cl.
CPC ........ *B60R 25/241* (2013.01); *G07C 9/00309* (2013.01); *B60R 2325/40* (2013.01)

(58) Field of Classification Search
CPC ... B60R 25/241; B60R 2325/40; B60R 25/24; B60R 25/245; B60R 25/10; B60R 25/34; G07C 9/00309; G07C 2009/00793
USPC ....................... 340/5.2, 5.22, 5.27
See application file for complete search history.

(56) References Cited

U.S. PATENT DOCUMENTS

| 5,499,022 A * | 3/1996 | Boschini | G07C 9/00309 340/5.72 |
| 5,969,597 A * | 10/1999 | Weigl | B60R 25/24 340/426.36 |
| 6,386,447 B1 * | 5/2002 | Proefke | G07C 9/00309 235/382 |
| 6,765,471 B1 * | 7/2004 | Baudard | G07C 9/00309 340/5.64 |
| 7,683,764 B2 * | 3/2010 | Kurpinski | B60R 25/2036 340/426.36 |
| 7,850,078 B2 * | 12/2010 | Christenson | B60R 25/24 235/382 |
| 7,961,076 B2 * | 6/2011 | Kelley | B60R 25/257 340/5.72 |
| 8,089,342 B2 * | 1/2012 | Sugiura | B60R 25/24 340/426.36 |
| 8,620,490 B2 * | 12/2013 | Lickfelt | B60R 25/00 701/2 |
| 8,717,142 B2 * | 5/2014 | Nagao | G07C 9/00309 340/426.36 |
| 9,076,274 B2 * | 7/2015 | Kamiya | B60R 25/245 |

(Continued)

*Primary Examiner* — Nam V Nguyen
(74) *Attorney, Agent, or Firm* — MCDONNELL BOEHNEN HULBERT & BERGHOFF LLP (57) ABSTRACT

A vehicle control system includes a controller and a first fob, wherein the controller is configured to control a first communicator of the vehicle to transmit a deactivation signal to the first fob based on the first fob being detected in the vehicle after locking the vehicle, and the first fob that includes a second communicator communicating with the first communicator and is configured to control the second communicator to switch at least one predetermined communication function to an inactive state based on the reception of the deactivation signal.

12 Claims, 5 Drawing Sheets

(56) References Cited

U.S. PATENT DOCUMENTS

| | | | |
|---|---|---|---|
| 9,299,205 B2* | 3/2016 | Kameyama | G07C 9/00 |
| 10,685,515 B2* | 6/2020 | Hazebrouck | G01S 5/0294 |
| 11,849,329 B2* | 12/2023 | Sakamoto | H04W 12/069 |
| 2009/0096578 A1* | 4/2009 | Ogino | B60R 25/245 |
| | | | 340/5.72 |
| 2015/0061856 A1* | 3/2015 | Raman | B60Q 9/00 |
| | | | 340/457 |
| 2016/0272152 A1* | 9/2016 | Iwata | G07C 9/00309 |
| 2021/0276512 A1* | 9/2021 | Elangovan | B60R 25/406 |

* cited by examiner

VEHICLE CONTROL SYSTEM AND METHOD OF CONTROLLING VEHICLE

CROSS REFERENCE TO RELATED APPLICATIONS

This application claims the benefit of Korean Patent Application No. 10-2021-0172875, filed on Dec. 6, 2021, which application is hereby incorporated herein by reference.

TECHNICAL FIELD

The present disclosure relates to a vehicle control system for preventing theft of a vehicle and improving convenience of vehicle control, and a method of controlling the vehicle.

BACKGROUND

Generally, various key systems with remote control functions are being applied to vehicles. For example, a user may use a fob such as a smart key to wirelessly lock or unlock a door of a vehicle from a remote location away from the vehicle, and may turn on or off an ignition of the vehicle.

However, a driver sometimes leaves a fob in a vehicle and locks the vehicle after exiting the vehicle. In this case, when a vehicle thief forcibly unlocks a vehicle and acquires the fob inside the vehicle, the vehicle may be operated by the vehicle thief. Furthermore, conventionally, when a vehicle is locked while a fob is left inside the vehicle, a vehicle forces convenience functions of the vehicle to be disabled in order to prevent the fob's battery from discharging, thereby causing a user's inconvenience.

SUMMARY

Various aspects of the present disclosure is to provide a vehicle control system capable of preventing theft of a vehicle by others by disabling a fob and limiting functions of the fob when a vehicle is locked while the fob is left inside the vehicle, and a method of controlling the vehicle.

Furthermore, various aspects of the present disclosure is to provide a vehicle control system capable of improving convenience of vehicle control by allowing a user to use a convenience function of a vehicle even in a state where the function of a fob is limited, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle control system includes a controller and a first fob, wherein the controller is configured to control a first communicator of the vehicle to transmit a deactivation signal to the first fob based on the first fob being detected in the vehicle after locking the vehicle, and the first fob including a second communicator communicating with the first communicator, the first fob configured to control the second communicator to switch at least one predetermined communication function to an inactive state based on the reception of the deactivation signal.

The first fob may be further configured to control the second communicator to deactivate other communication functions except for a transponder (TP) communication function.

The controller may be further configured to control the first communicator to deactivate a TP communication function of the vehicle based on the detection of the first fob in the vehicle, and the first fob may be further configured to control the second communicator to deactivate a low frequency (LF) communication function and a radio frequency (RF) communication function when switched to the inactive state.

The controller may be further configured to unlock the vehicle based on an authentication of a second fob located outside the vehicle, and control the first communicator to activate the TP communication function of the vehicle after unlocking the vehicle.

The first fob may be further configured to control the second communicator to activate the LF communication function and the RF communication function based on the TP communication with the first communicator of the vehicle.

The controller may be further configured to delete identification information of the first fob after transmitting the deactivation signal to the first fob, and store the identification information of the first fob based on the TP communication with the first fob after unlocking the vehicle by the authentication of the second fob.

In accordance with another aspect of the disclosure, a method of controlling a vehicle includes controlling a first communicator of the vehicle to transmit a deactivation signal to a first fob based on the first fob being detected in the vehicle after locking the vehicle, and controlling a second communicator of the first fob to switch at least one predetermined communication function of the first fob to an inactive state based on the deactivation signal.

The controlling the second communicator of the first fob may further includes deactivating other communication functions except for a TP communication function of the first fob.

The controlling the first communicator of the vehicle may further includes deactivating a TP communication function of the vehicle based on the detection of the first fob in the vehicle, and controlling the second communicator of the first fob may further include deactivating a LF communication function and a RF communication function of the first fob.

The method may further include unlocking the vehicle based on an authentication of a second fob located outside the vehicle, wherein controlling the first communicator of the vehicle may further include activating the TP communication function of the vehicle after unlocking the vehicle.

The controlling the second communicator of the first fob may further include activating the LF communication function and the RF communication function of the first fob based on the TP communication with the first communicator of the vehicle.

The method may further include deleting identification information of the first fob stored in a controller of the vehicle after transmitting the deactivation signal to the first fob, and storing the identification information of the first fob in the controller based on the TP communication between the first communicator of the vehicle and the first fob after unlocking the vehicle by the authentication of the second fob.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the disclosure will be described in detail with reference to the accompanying drawings.

Figure 1:
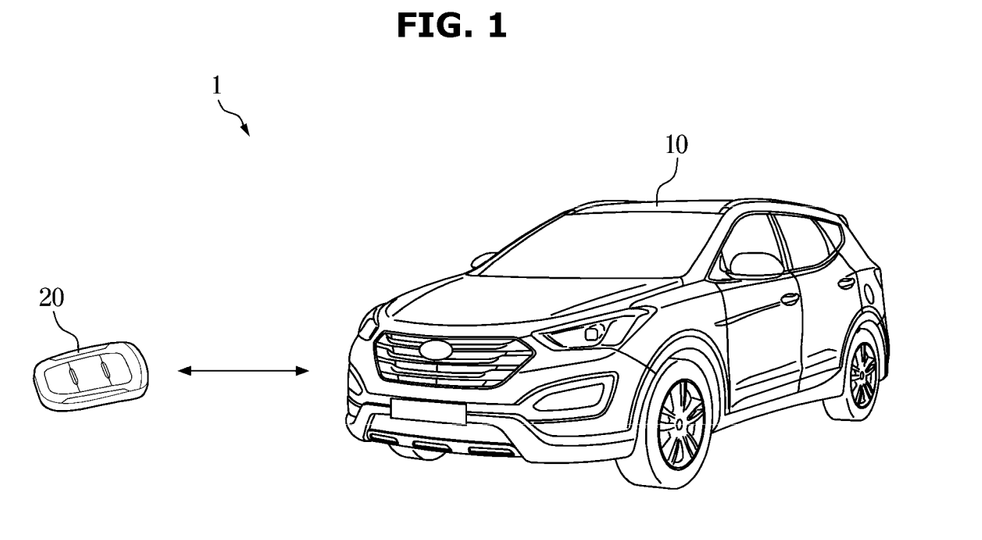
FIG. 1 shows a vehicle control system according to an exemplary embodiment of the disclosure.
Figure 2:
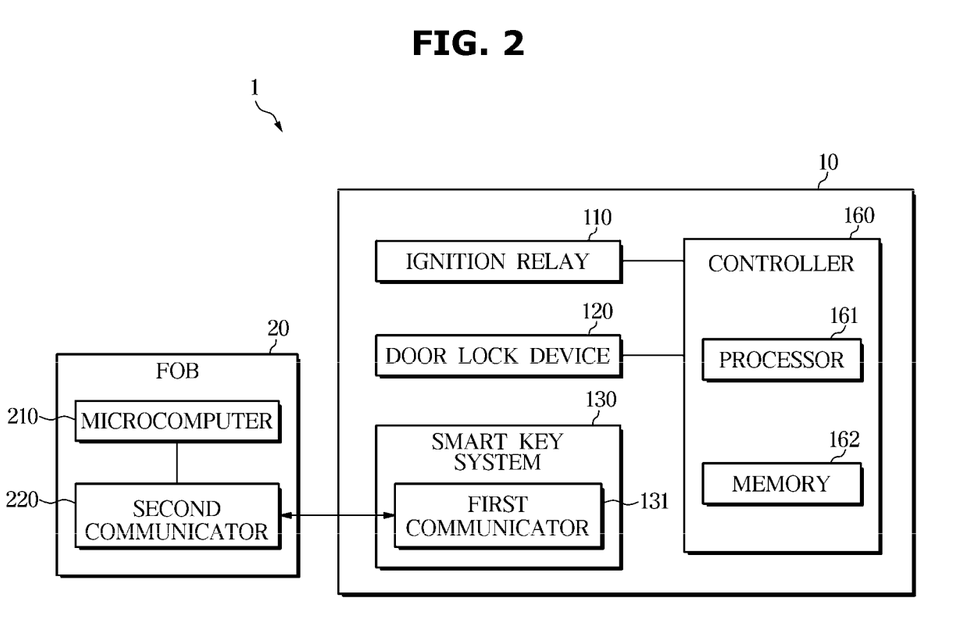
FIG. 2 is a block diagram illustrating components of a vehicle control system according to an exemplary embodiment of the disclosure.
Figure 3:
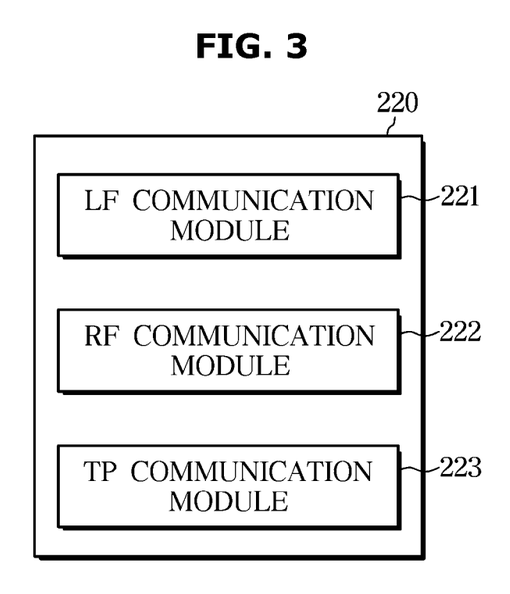
FIG. 3 is a block diagram illustrating components of a communicator for communication between a Fob and a smart key system of a vehicle according to an exemplary embodiment of the disclosure.

FIG. 1 shows a vehicle control system according to an exemplary embodiment of the disclosure. FIG. 2 is a block diagram illustrating components of a vehicle control system according to an exemplary embodiment of the disclosure. FIG. 3 is a block diagram illustrating components of a communicator for communication between a Fob and a smart key system of a vehicle according to an exemplary embodiment of the disclosure.

Referring to FIG. 1, a vehicle control system 1 may include a vehicle 10 and a fob 20. The fob 20 is a device such as a remote control capable of executing various functions of the vehicle 10, and may be referred to as a smart key or a key fob. The fob 20 may be provided in various forms. For example, the fob 20 may be provided as a device including various buttons or as a software installed on a mobile device such as a smart phone.

The vehicle 10 may execute various functions of the vehicle 10 based on control signals transmitted from the fob 20. For example, according to a manipulation of the fob 20 by a user, locking/unlocking of the vehicle 10, opening/closing of a trunk, on/off of an ignition of the vehicle, and/or on/off of a welcome light may be performed.

Referring to FIG. 2, the vehicle 10 may include an ignition relay 110, a door lock device 120, a smart key system 130, and a controller 160. The controller 160 may be electrically connected to electronic devices of the vehicle 10 and may control operations of the electronic devices. The smart key system 130 may include a first communicator 131. Although the smart key system 130 and the controller 160 are shown separately, the smart key system 130 may be integrated into the controller 160.

Referring to FIGS. 2 and 3, the fob 20 may include a microcomputer 210 and a second communicator 220. The microcomputer 210 controls the second communicator 220. The second communicator 220 of the fob 20 may include a low frequency (LF) communication module 221, a radio frequency (RF) communication module 222, and a transponder (TP) communication module 223. The second communicator 220 of the fob 20 may communicate with the first communicator 130 of the smart key system 130 provided in the vehicle 10 using LF communication, RF communication, and/or TP communication. The LF communication module 221 may include an LF antenna, the RF communication module 222 may include an RF antenna, and the TP communication module 223 may include a TP antenna.

Although not shown in drawings, the first communicator 131 of the vehicle 10 may also include the LF communication module, the RF communication module, and the TP communication module. A plurality of antennas for LF communication, RF communication, and TP communication may be provided interior and exterior of the vehicle 10.

The LF communication module, the RF communication module, and the TP communication module included in the first communicator 131 of the vehicle 10 may be referred to as a first LF communication module, a first RF communication module, and a first TP communication module, respectively. The LF communication module 221, the RF communication module 222, and the TP communication module 223 included in the second communicator 220 of the fob 20 may also be referred to as a second LF communication module, a second RF communication module, and a TP communication module.

The LF communication may be performed when a distance between the vehicle 10 and the fob 20 is relatively short. For example, even if users do not press the button of the fob 20 for unlocking a trunk, when the fob 20 is close to the vehicle 10, the controller 160 of the vehicle 10 may receive a signal transmitted from the fob 20 through the LF communication, and automatically unlock the trunk of the vehicle 10. The microcomputer 210 of the fob 20 may control the LF communication module 221 to transmit an LF signal.

The RF communication may be performed when the distance between the vehicle 10 and the fob 20 is relatively long. For example, even if the fob 20 is far away from the vehicle 10, the controller 160 of the vehicle 10 may receive a signal transmitted from the fob 20 to lock or unlock a door of the vehicle 10. When users press a door button of the fob 20, the microcomputer 210 of the fob 20 may control the RF communication module 222 of the second communicator 220 to transmit a lock signal or unlock signal of the door. Furthermore, when users press a trunk button of the fob 20, the microcomputer 210 of the fob 20 may control the RF communication module 222 of the second communicator 220 to transmit a lock signal or unlock signal of the trunk to the RF communication module 222 of the second communicator 220.

The TP communication may be performed when the distance between the vehicle 10 and the fob 20 is very close. The TP communication module may be provided inside the vehicle 10. The TP communication module may be provided on various locations inside the vehicle 10. For example, the TP communication module may be embedded in a start button, a steering wheel, or a center console.

When the fob 20 approaches the TP communication module of the vehicle 10 very closely, the controller 160 of the vehicle 10 may perform a predetermined function in response to a TP signal transmitted from the fob 20. For example, the controller 160 of the vehicle 10 may perform authentication of the FOB 20 through the TP communication, and turn on the ignition of the vehicle 10 based on a start-on input through the ignition relay 110 after the authentication of the FOB 20.

Meanwhile, the TP communication module 223 of the fob 20 may operate with very little power. Power required for the operation of the TP communication module 223 is smaller than the power required for the operation of the LF communication module 221 and the RF communication module 222. Accordingly, the TP communication between the fob 20 and the vehicle 10 is available even if a battery remaining amount of the fob 20 is very low.

The ignition relay 110 is provided to turn on and off the ignition of the vehicle 10. The ignition relay 110 may also be called a start switch and may be provided in the form of a button. When the ignition relay 110 is turned on, the vehicle 10 is started, and when the ignition relay 110 is turned off, the vehicle 10 is turned off. The controller 160 may turn on or off the ignition of the vehicle 10 based on a signal transmitted from the ignition relay 110.

The door lock device 120 may lock or unlock the door of the vehicle 10 under control of the controller 160. For example, the controller 160 may control the door lock device 120 to lock the door based on a vehicle locking signal transmitted from the fob 20. The controller 160 may control the door lock device 120 to unlock the door based on a vehicle unlocking signal transmitted from the fob 20.

The controller 160 of the vehicle 10 includes a memory 162 that stores temporary programs, instructions, and data for controlling operation of the vehicle 10, and a processor 161 that generates a control signal for controlling the operation of the vehicle 10 based on the programs, instructions, and data which are stored/stored temporary in the memory 162. The processor 161 may process data of various sensors provided in the vehicle 10.

The processor 161 and the memory 162 may be implemented as separate chips or as a single chip. Furthermore, the controller 160 may include a plurality of processors 161 and a plurality of memories 162. The memory 162 may include not only volatile memories such as a static random access memory (S-RAM) and a dynamic random-access memory (D-RAM), but also non-volatile memory such as a flash memory, a read-only memory (ROM), an erasable programmable read only memory (EPROM), and the like.

The processor 161 may include a logic circuit and an arithmetic circuit, process data according to programs and/or instructions provided from the memory 162, and generate a control signal according to a processing result. The processor 161 may be electrically connected to various electronic devices included in the vehicle 10.

In addition to the above-described components, the vehicle 10 may include various components. For example, the vehicle 10 may include an engine and a transmission. The engine includes a cylinder and a piston, and may generate power for driving the vehicle 10. The transmission includes a plurality of gears, and may transmit power generated by the engine to wheels of the vehicle. A braking device may decelerate or stop the vehicle 10 through friction with the wheels. A steering device may change a driving direction of the vehicle 10. When the vehicle 10 is an electric vehicle, the engine may be replaced by a motor, and power for driving the vehicle 10 may be generated by the motor.

Furthermore, the vehicle 10 may include various electronic devices such as an Engine Management System (EMS), a Transmission Control Unit (TCU), an Electronic Brake Control Module (EBCM), and an Electronic Power Steering (EPS), a body control module (BCM), and a driver assistance system (DAS).

The BCM may control operation of electronic components for providing a driver's convenience or ensuring a driver's safety. For example, the BCM may control a headlamp, a wiper, a cluster, a multi-function switch, and a turn indicator lamp. The controller 160 may include the BCM.

Furthermore, the vehicle 10 may further include a communicator (not shown) for communicating with other external devices in addition to the fob 20. For example, vehicle 10 may include a communication device for communicating with a mobile device such as a smartphone, any other vehicle, and/or a road infrastructure.

The above electronic components may communicate with each other through a communication network (NT) for a vehicle. For example, electronic components exchange data through an Ethernet, a Media Oriented Systems Transport (MOST), a Flexray, a Controller Area Network (CAN), and a Local Interconnect Network (LIN), and the like.

Generally, two fobs are provided when the vehicle 10 is purchased. There is a case where a user locks the vehicle 10 after exiting the vehicle while leaving one fob 20 in the vehicle 10. In this case, the problem is that if a thief forcibly unlocks the vehicle 10 and obtains the fob 20 inside the vehicle 10, the vehicle 10 may be driven by the thief. The prior art attempts to prevent a vehicle theft in such a way that the controller 160 of the vehicle 10 does not process the signal transmitted from the fob 20. In other words, the prior art does not directly limit the operation of the fob 20 positioned inside the vehicle 10.

Furthermore, when the vehicle is locked while the fob 20 is present inside the vehicle 10, to prevent a battery discharge of the fob 20, the prior art does not limit the operation of the fob 20 but deactivate convenient functions of the vehicle 10 such as an approach unlock function, thereby causing a user's inconvenience. The approach unlock function may be defined as a function of unlocking a door lock or unlocking a door handle when a user carrying a fob from the outside of the vehicle 10 approaches the vehicle 10. When the approach unlock function of the vehicle 10 is deactivated, even if the user with the other fob approaches the vehicle 10, the door is not unlocked, thereby causing the user to experience inconvenience.

To solve these problems, the vehicle control system 1 according to an exemplary embodiment of the disclosure deactivates the fob 20 and limits functions of the fob 20 when the vehicle is locked while the fob 20 is present inside the vehicle 10. In other words, the vehicle control system 1 according to an exemplary embodiment of the disclosure controls the fob 20 located inside the vehicle 10 to deactivate itself.

More specifically, the controller 160 of the vehicle 10 may search whether the fob 20 is present in the vehicle 10 based on the locking of the vehicle 10. The fob detected by the search may be referred to as a first fob 20. The controller 160 of the vehicle 10 may control the first communicator 131 to transmit a deactivation signal to the first fob 20 based on the detection of the first fob 20 in the vehicle 10 after the vehicle 10 is locked. After transmitting the deactivation signal to the first fob 20, the controller 160 may delete identification information of the first fob 20. Operation of the vehicle 10 using the first fob 20 is unavailable until the controller 160 stores the identification information of the first fob 20 again.

The microcomputer 210 of the first fob 20 located inside the vehicle 10 may control the second communicator 220 to switch at least one predetermined communication function to an inactive state based on the reception of the deactivation signal. The microcomputer 210 of the first fob 20 may control the second communicator 220 to deactivate other communication functions except for the TP communication function based on the reception of the deactivation signal. In other words, the microcomputer 210 of the first fob 20 may maintain operation of the TP communication module 223. To activate the deactivated first fob 20 again, maintaining the TP communication function of the first fob 20 in an activated state is required.

Furthermore, the controller 160 may control the first communicator 131 to deactivate the TP communication function of the vehicle 10 based on the detection of the first fob 20 in the vehicle 10. By deactivating the TP communication function of the vehicle 10, the TP communication between the vehicle 10 and the first fob 20 may be blocked even if the TP communication function of the first fob 20 is maintained.

The microcomputer 210 of the first fob 20 may control the second communicator 220 to deactivate at least one of the LF communication function or the RF communication function when switched to the inactive state. The microcomputer 210 of the first fob 20 may stop the operation of the LF communication module 221 in order to limit the LF communication function. The microcomputer 210 of the first fob 20 may stop the operation of the RF communication module 222 in order to limit the RF communication function. In other words, the microcomputer 210 of the first fob 20 may stop supplying power to at least one of the LF communication module 221 or the RF communication module 222.

As such, by stopping the operations of the LF communication module 221 and the RF communication module 222, the communication function of the first fob 20 may be limited. Accordingly, if a vehicle thief attempts to drive the vehicle 10 using the first fob 20 inside the vehicle 10, functions of the vehicle 10 requiring the LF communication or RF communication between the first fob 20 and the vehicle 10 may not be executed, so that the theft of the vehicle 10 may be prevented.

Furthermore, by stopping the operation of the LF communication module 221 and the RF communication module 222, which consume a lot of power, it is also possible to prevent the battery of the first fob 20 from being discharged. Whereas, the vehicle 10 only limits the TP communication function of the smart key system 130, and does not limit other convenient functions. Accordingly, the user may execute convenient functions of the vehicle 10, such as opening/closing the trunk, turn on/off of the welcome light, and unlocking the smart approach, by using the other fob from the outside of the vehicle 10. The other fob that located outside the vehicle 10 may be referred to as a second fob.

As such, by deactivating the first fob 20 inside the vehicle 10 while maintaining the convenient functions of the vehicle 10 in the activated state, both theft prevention of the vehicle 10 and improvement of user convenience may be achieved.

The controller 160 of the vehicle 10 may unlock the vehicle 10 based on the authentication of the second fob located outside the vehicle 10. For example, when a user carrying the second fob approaches the vehicle 10, the controller 160 may identify the second fob, and unlock the vehicle 10 based on the identification of the second fob.

The controller 160 of the vehicle 10 may control the first communicator 131 to activate the TP communication function of the vehicle 10 after unlocking the vehicle 10. Accordingly, the TP communication between the vehicle 10 and the first fob 20 located inside the vehicle 10 is available. The controller 160 may store identification information of the first fob 20 based on the TP communication with the first fob 20 after unlocking the vehicle 10 by the authentication of the second fob.

The microcomputer 210 of the first fob 20 may control the second communicator 220 in order to activate the LF communication function and the RF communication function based on the TP communication with the first communicator 131 of the vehicle 10. For example, when the first fob 20 is in communication contact with the ignition relay 110 of the vehicle 10 including the TP communication module, the first fob 20 may transmit/receive a TP signal to/from the vehicle 10. The microcomputer 210 of the first fob 20 may supply power to the LF communication module 221 so that the function of LF communication is activated based on the successful TP communication with the vehicle 10, and supply power to the RF communication module 222 so that the function of RF communication is activated. The controller 160 of the vehicle 10 may store identification information of the first fob 20 based on the TP communication with the first fob 20. Accordingly, the first fob 20 may be switched to the activated state capable of performing all functions.

As such, by requiring the authentication of the second fob located outside the vehicle 10 for activation of the first fob 20 inside the vehicle 10, the occurrence of vehicle theft may be more reliably prevented.

Figure 4:
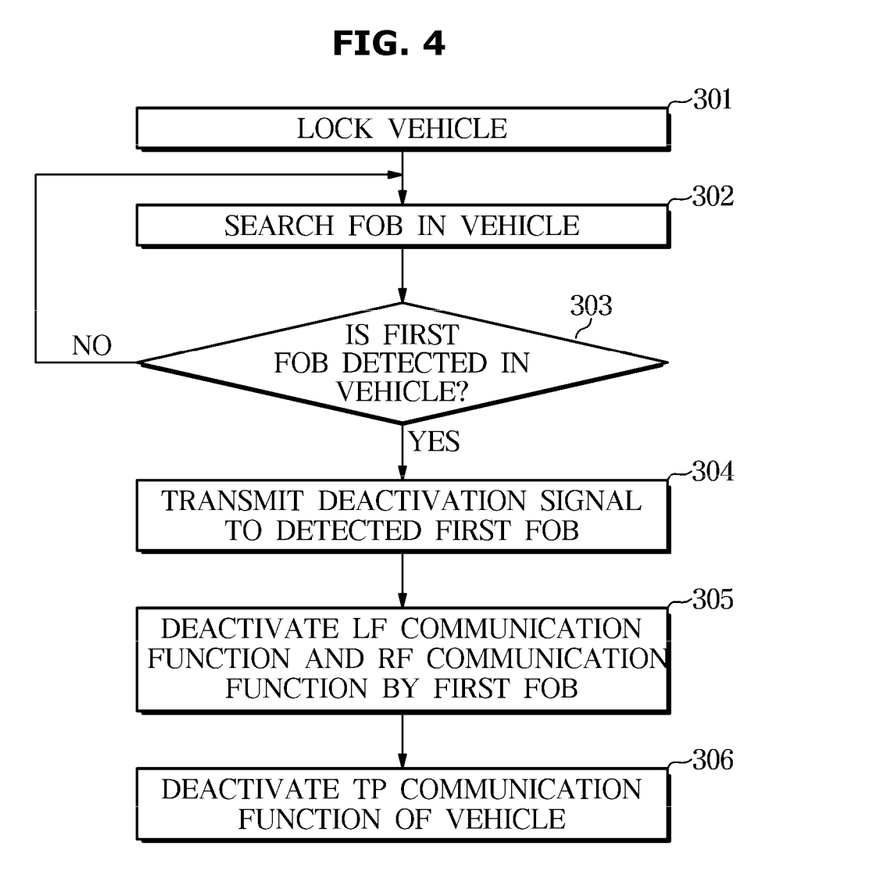
FIG. 4 is a flowchart illustrating a method of deactivating a Fob among vehicle control methods according to an exemplary embodiment of the disclosure.
Figure 5:
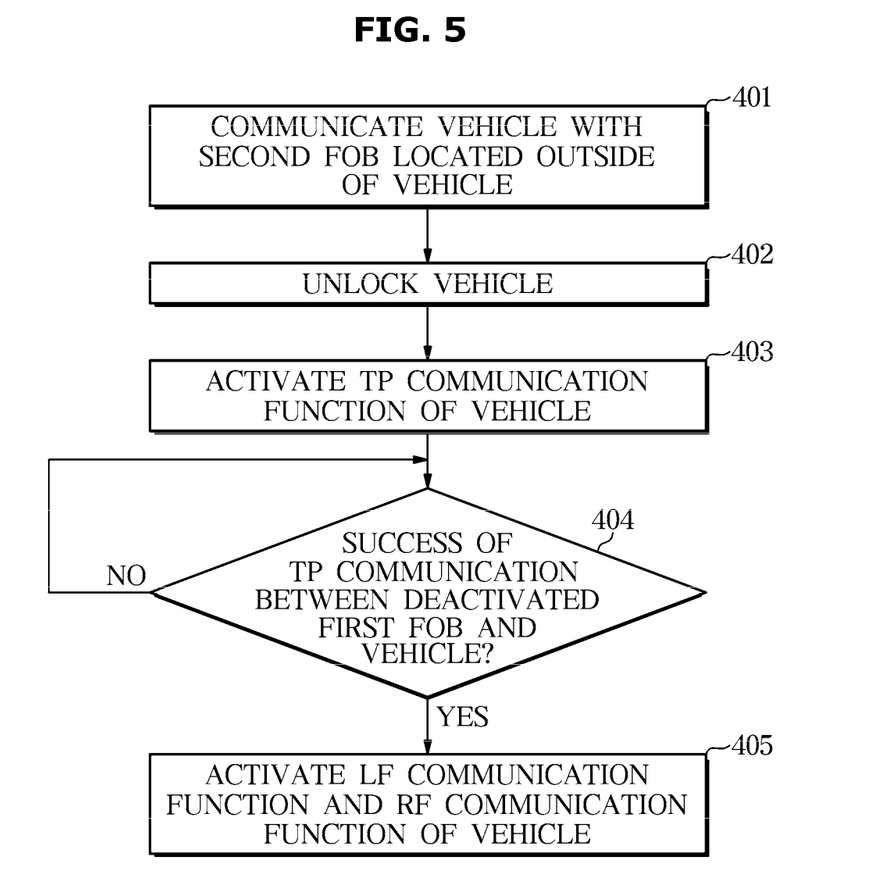
FIG. 5 is a flowchart illustrating a method of re-activating the deactivated Fob among vehicle control methods according to an exemplary embodiment of the disclosure.

Hereinafter, a method for controlling a vehicle according to an exemplary embodiment of the disclosure will be described with reference to FIGS. 4 and 5. FIGS. 4 and 5 are separately illustrated for convenience of description, but may be connected as a single flowchart.

FIG. 4 is a flowchart illustrating a method of deactivating a fob in a vehicle control method according to an exemplary embodiment of the disclosure.

Referring to FIG. 4, the controller 160 of the vehicle 10 may identify whether the vehicle is locked based on a signal transmitted from the door lock device 120. The controller 160 may search whether the fob 20 is present in the vehicle 10 based on the locking of the vehicle 10 at 301 and 302. The fob detected by the search may be referred to as the first fob 20. The controller 160 may control the first communicator 131 of the vehicle 10 to transmit the deactivation signal to the first fob 20 based on the detection of the first fob 20 in the vehicle 10 after locking the vehicle 10 at 303 and 304.

The microcomputer 210 of the first fob 20 located inside the vehicle 10 may control the second communicator 220 to switch the at least one predetermined communication function to the inactive state based on the reception of the deactivation signal. The microcomputer 210 of the first fob 20 may control the second communicator 220 to deactivate the other communication functions except for the TP communication function based on the reception of the deactivation signal. For example, the microcomputer 210 of the first fob 20 may control the second communicator 220 to deactivate the LF communication function and the RF communication function when switched to the inactive state at 305.

As such, the communication function of the first fob 20 may be limited by stopping the operation of the LF communication module 221 and the RF communication module 222. Accordingly, if a vehicle thief attempts to drive the vehicle 10 using the first fob 20 inside the vehicle 10, the functions of the vehicle 10 requiring the LF communication or RF communication between the first fob 20 and the vehicle 10 may not be executed, so that the theft of the vehicle 10 may be prevented.

Furthermore, the controller 160 of the vehicle 10 may control the first communicator 131 to deactivate the TP communication function of the vehicle 10 based on the detection of the first fob 20 in the vehicle 10 at 306. By deactivating the TP communication function of the vehicle 10, the TP communication between the vehicle 10 and the first fob 20 may be blocked if the TP communication function of the first fob 20 is maintained.

FIG. 5 is a flowchart illustrating a method of re-activating the deactivated fob in a vehicle control method according to an exemplary embodiment of the disclosure.

Referring to FIG. 5, the controller 160 of the vehicle 10 may unlock the vehicle 10 based on the authentication of the second fob located outside the vehicle 10 at 401 and 402. For example, when a user carrying the second fob approaches the vehicle 10, the controller 160 may identify the second fob, and unlock the vehicle 10 based on the identification of the second fob.

The controller 160 of the vehicle 10 may control the first communicator 131 to activate the function of the TP communication of the vehicle 10 after unlocking the vehicle 10 at 403. Accordingly, the TP communication between the vehicle 10 and the first fob 20 located inside the vehicle 10 is available.

The microcomputer 210 of the first fob 20 may control the second communicator 220 to activate the functions of the LF communication and the RF communication based on the TP communication with the first communicator 131 of the vehicle 10 at 404 and 405. For example, when the first fob 20 is in communication contact with the ignition relay 110 of the vehicle 10 including the TP communication module, the first fob 20 may transmit/receive the TP signal to/from the vehicle 10. The microcomputer 210 of the first fob 20 may supply power to the LF communication module 221 so that the function of LF communication is activated based on the successful TP communication with the vehicle 10, and supply power to the RF communication module 222 so that the function of RF communication is activated. Accordingly, the first fob 20 may be switched to the activated state capable of performing all functions.

As is apparent from the above, the vehicle control system and the method of controlling thereof according to an embodiment of the disclosure may prevent the theft of the vehicle by others by inactivating the fob and limiting the function of the fob when the vehicle is locked while the fob is present inside the vehicle.

Furthermore, the vehicle control system and the method of controlling thereof according to an embodiment of the disclosure may improve convenience of vehicle control by allowing users to use convenience function of the vehicle in a state in which the function of the FOB is limited. In addition, discharge of the fob may also be prevented.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

The invention claimed is:

1. A vehicle control system comprising:
   a controller; and
   a first fob;
   wherein the controller is configured to:
   control a first communicator of a vehicle to transmit a deactivation signal to the first fob based on the first fob and to deactivate a transponder (TP) communication function of the vehicle being detected in the vehicle after locking the vehicle; and
   the first fob including a second communicator communicating with the first communicator, the first fob configured to control the second communicator to switch at least one predetermined communication function to an inactive state based on the reception of the deactivation signal.

2. The vehicle control system of claim 1, wherein the first fob is further configured to:
   control the second communicator to deactivate communication functions except for a transponder (TP) communication function.

3. The vehicle control system of claim 1, wherein:
   the first fob is further configured to control the second communicator to deactivate a low frequency (LF) communication function and a radio frequency (RF) communication function when switched to the inactive state.

4. The vehicle control system of claim 3, wherein the controller is further configured to:
   unlock the vehicle based on an authentication of a second fob located outside the vehicle; and
   control the first communicator to activate the TP communication function of the vehicle after unlocking the vehicle.

5. The vehicle control system of claim 4, wherein the first fob is further configured to:
   control the second communicator to activate the LF communication function and the RF communication function based on the TP communication with the first communicator of the vehicle.

6. The vehicle control system of claim 4, wherein the controller is further configured to:
 delete identification information of the first fob after transmitting the deactivation signal to the first fob; and
 store the identification information of the first fob based on the TP communication with the first fob after unlocking the vehicle by the authentication of the second fob.

7. A method of controlling a vehicle, the method comprising:
 controlling a first communicator of the vehicle to transmit a deactivation signal to a first fob and to deactivate a transponder (TP) communication function of the vehicle based on the first fob being detected in the vehicle after locking the vehicle; and
 controlling a second communicator of the first fob to switch at least one predetermined communication function of the first fob to an inactive state based on the deactivation signal.

8. The method of claim 7, wherein controlling the second communicator of the first fob further comprises:
 deactivating communication functions except for a transponder (TP) communication function of the first fob.

9. The method of claim 7, wherein
 wherein controlling the second communicator of the first fob further comprises:
 deactivating a low frequency (LF) communication function and a radio frequency (RF) communication function of the first fob.

10. The method of claim 9, further comprising unlocking the vehicle based on an authentication of a second fob located outside the vehicle, wherein controlling the first communicator of the vehicle further comprises activating the TP communication function of the vehicle after unlocking the vehicle.

11. The method of claim 10, wherein controlling the second communicator of the first fob further comprises:
 activating the LF communication function and the RF communication function of the first fob based on the TP communication with the first communicator of the vehicle.

12. The method of claim 10, further comprising:
 deleting identification information of the first fob stored in a controller of the vehicle after transmitting the deactivation signal to the first fob; and
 storing the identification information of the first fob in the controller based on the TP communication between the first communicator of the vehicle and the first fob after unlocking the vehicle by the authentication of the second fob.

* * * * *